United States Patent
Chow

(10) Patent No.: US 7,805,608 B2
(45) Date of Patent: Sep. 28, 2010

(54) USER PRIVACY THROUGH ONE-SIDED COOKIES

(75) Inventor: Richard T. Chow, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 999 days.

(21) Appl. No.: 11/592,793

(22) Filed: Nov. 3, 2006

(65) Prior Publication Data

US 2008/0123861 A1    May 29, 2008

(51) Int. Cl.
*H04L 29/00* (2006.01)
(52) U.S. Cl. .................. 713/168; 713/171; 380/277; 380/278; 380/279
(58) Field of Classification Search ......... 380/277–279; 713/168, 171
See application file for complete search history.

(56) References Cited

U.S. PATENT DOCUMENTS

| | | | | |
|---|---|---|---|---|
| 6,601,170 B1* | 7/2003 | Wallace, Jr. | ............... | 713/168 |
| 2002/0004784 A1* | 1/2002 | Forbes et al. | ............... | 705/51 |
| 2004/0177260 A1* | 9/2004 | Gilfix et al. | ............... | 713/193 |
| 2006/0224902 A1* | 10/2006 | Bolt | ............... | 713/193 |
| 2008/0056501 A1* | 3/2008 | McGough | ............... | 380/281 |

OTHER PUBLICATIONS

U.S. Appl. No. 60/842,595 The Real Privacy Management (RPM) Authentication System, McGough (file date Sep. 6, 2006) pp. 1-27.*
U.S. Appl. No. 60/842,595—"The Real Privacy Management (RPM) Authentication System", McGough, filed Sep. 6, 2006).*

* cited by examiner

*Primary Examiner*—Kambiz Zand
*Assistant Examiner*—Helai Salehi
(74) *Attorney, Agent, or Firm*—Hickman Palermo Truong & Becker LLP; Daniel D. Ledesma

(57) ABSTRACT

Techniques for ensuring privacy of users are provided. In one approach, a Web server receives a request from a Web browser. The Web browser generates an encryption key and sends the encryption key to the Web browser in a cookie. The Web server later encrypts the request (or any portion thereof) using the encryption key and deletes the encryption key so that the Web server is unable to determine the actual contents of the encrypted data. If the user does not delete the cookie (which would delete the encryption key), then a later request from the Web browser includes the cookie and the encryption key. The Web server is then able to decrypt the previously encrypted data and perform substantive analysis on the decrypted data.

20 Claims, 3 Drawing Sheets

USER PRIVACY THROUGH ONE-SIDED COOKIES

FIELD OF THE INVENTION

The present invention relates to user privacy, and in particular, to improving user privacy through the use of cookies.

BACKGROUND

The most widely used part of the Internet is the World Wide Web, often abbreviated "WWW" or simply referred to as just "the Web". The Web is an Internet service that organizes information through the use of hypermedia. The HyperText Markup Language ("HTML") is typically used to specify the content and format of a hypermedia document (e.g., a Web page).

Each Web page can contain embedded references, referred to as "links", to images, audio, video or other Web pages. The most common type of link used to identify and locate resources on the Internet is the Uniform Resource Locator, or URL. In the context of the Web, a user, using a Web browser, browses for information by selecting links that are embedded in each Web page.

An important aspect of browsing the Web is the use of Internet "cookies". In general, a cookie is data that is included in the header of a Web page sent by a Web server to a Web browser that is returned by the Web browser to the Web server whenever the Web browser requests Web pages from the Web server.

FIG. 1 is a sequence diagram that illustrates a typical exchange of cookie information based on a user request. At step 1, Web browser 102 issues a request for data from Web server 104. At step 2, Web server 104 processes the request and provides a cookie along with a response including the requested data to Web browser 102. According to HyperText Transfer Protocol (HTTP), Web server 104 sends the response with a HTTP header that includes a "Set-Cookie" command associated with a corresponding name and value. For example, the HTTP header may include the statement "Set-Cookie: RMID=732423sdfs73242". Thus, the name of this cookie is "RMID" and the value of the cookie is "732423sdfs73242".

The "Set-Cookie" instruction requests Web browser 102 to store the name=value string and to send it back in all future requests to Web server 104. Thus, some time later, at step 3, Web browser 102 issues another request for data from Web server 104. This latter request includes the cookie that originated from Web server 104. Web browser 102 only offers a particular cookie to the Web server 104 (or domain) that set the particular cookie.

Cookies can contain any arbitrary information a Web server chooses and are used to maintain state between otherwise stateless HTTP transactions. Cookies are typically used to authenticate or identify a registered user of a Web site as part of their first login process or initial site registration without requiring them to sign in again every time they access that site. Other uses include maintaining a "shopping basket" of goods selected for purchase during a session at a site, site personalization (presenting different pages to different users), and tracking a particular user's access to a site. Thus, cookies are used to uniquely identify users.

Privacy issues relating to the use of cookies has been the topic of recent discussion. Much of the discussion, however, has evolved around common misconceptions about cookies. Some misconceptions include the following: (1) cookies are like worms and viruses in that they can erase data from the user's hard disks; (2) cookies are a form of spyware in that they can read personal information stored on the user's computer; (3) cookies generate popups; (4) cookies are used for spamming; and (5) cookies are only used for advertising. Typically, cookies are only data, not program code—thus, cookies cannot erase or read information from a user's computer.

However, cookies do allow for detecting the webpages viewed by a user on a given website or set of websites. This information can be collected in a profile of the user. Such profiles are often anonymous; that is, profiles do not contain personal information of the user (e.g., name, address, etc.). More precisely, profiles cannot contain personal information unless the user has made it available to some sites.

Furthermore, profiles are not easy to generate because a profiler must agree with different websites to put, e.g., ads on those websites. When a Web browser downloads webpages from those websites, the Web browser also downloads the ads from the profiler. The profiler can then set a cookie with respect to the Web browser and then determine which websites the particular user is visiting. Additional information on cookies is provided in Request For Comment (RFC) 2109.

Although the use of cookies is a relatively innocuous technique for a website to track activity of a particular user on that website, many users would feel more comfortable that the information that they share with certain websites is (1) not stored for an appreciable amount of time and (2) not shared with any other entity. Such information may include, for example, IP address of the user, the webpages and/or files requested by the user, terms of a search query submitted by the user, etc.

One approach that a website might implement for respecting the privacy of users may be to not keep track of IP addresses and other information submitted in user requests. However, such an approach is undesirable for many reasons. In the context of Web queries, performing analysis on the search terms of a query could assist the corresponding search engine in deciding which advertisements to provide to the user.

For example, if a user has previously searched for vacation plans to Mexico and later submits a query unrelated to vacations or Mexico, the search engine could use the previous information to provide information to the user advertising certain Caribbean cruise lines. If that previous information was not stored and associated with that user, then the search engine could not leverage the previous information to its benefit.

Another example of performing analysis on search terms is in the context of click fraud. Some unscrupulous users click on advertisements without any intent on purchasing the product or service promoted thereby. Such users are motivated by generating ad revenue for themselves or depleting the ad revenue of a competitor. Keeping track of who is submitting such requests allows click fraud analyzers to identify such users and prevent further attacks from those users.

Another approach that a website might implement for respecting the privacy of users may be to store cookie information for users only for a limited time (e.g., two weeks) and afterwards deleting information associated with a user, such as IP address or search terms. This approach allows some analysis of user requests to be performed while ensuring that users' privacy is guaranteed in the long run. However, this approach is also unattractive because much off-line filtering and manual analysis requires many consecutive months worth of data.

Another approach that a website might implement for respecting the privacy of users may be to disassociate the IP address from other parts of a user request. For example, suppose a user submits a search query. The search engine may delete IP address information and store the terms of the search query. However, this approach is disadvantageous in various contexts for similar reasons stated above—for example, click fraud will be more difficult to identify and prevent.

Furthermore, in the Web query case, stripping out IP and cookie data may not be enough to ensure privacy of the user because search terms themselves might have enough information to deduce who sent the query.

Therefore, there is a need to better balance the privacy interests of users with the aims of various websites to perform analysis on user requests.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
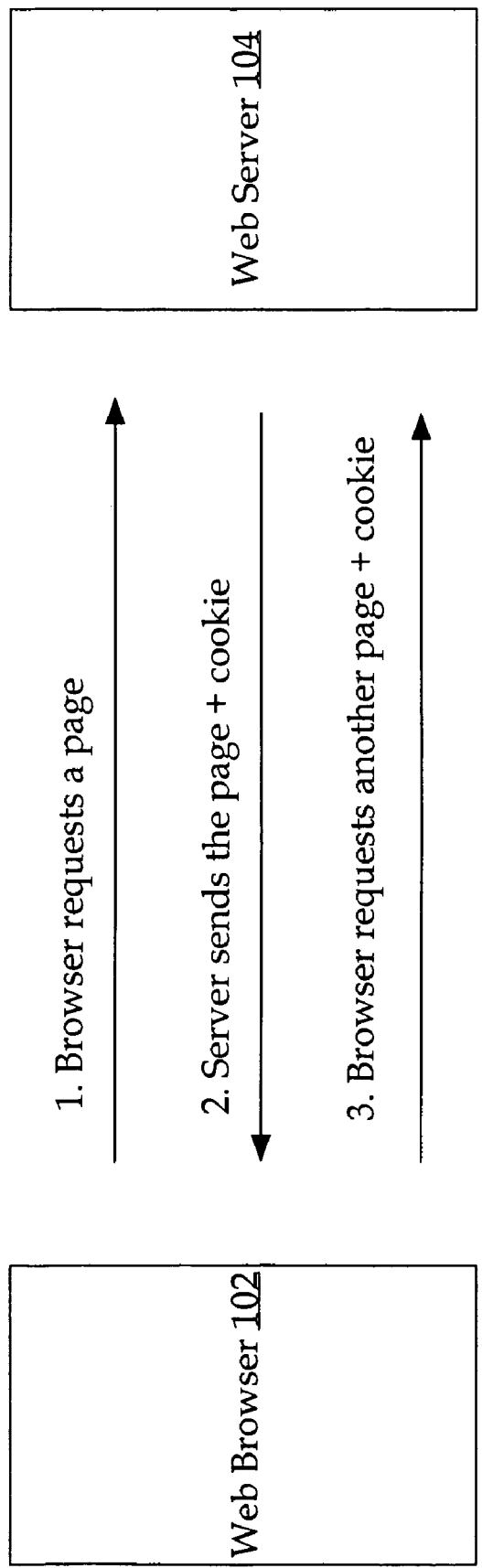
FIG. 1 is a sequence diagram that illustrates a typical exchange of cookie information based on a user request.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

For example, the following description is in the context of cookies. However, embodiments of the invention are not limited to the use of cookies. Although cookies are a convenient mechanism for sending and receiving data unique to a particular user (because all Web browsers provide that functionality), any mechanism for sending and receiving encryption keys may be used.

Also, although the following description is in the context of the Web (i.e., communications between Web browsers and Web servers), embodiments of the invention are applicable to other client-server models.

For example, the client-server model is a simple network architecture that separates the client from a server. Under this model, the client and server are generally separate computer systems that are under control of different parties (e.g., individuals, businesses, organizations). A client is typically the active participant in that the client initiates communication (i.e., submits requests to the server) over a network. The server is passive in that the server waits for requests. When the server receives a request, the server processes the request and replies to the requesting client. Thus, embodiments of the invention are not limited to the field of Web technology.

General Overview

Techniques are provided for ensuring at least limited privacy of a user while allowing website owners to analyze user requests for a period of time. When a user request data from a website, the website generates an encryption key and includes the encryption key in a cookie that is sent back to the user. The user request may be immediately analyzed (manually or automatically) and then, after a certain period of time, the website uses the encryption key to encrypt data from the initial request or set of requests. The website owner then causes the encryption key to be deleted. Deleting the encryption key effectively "seals" the encrypted data from the website's perspective because only the user has the encryption key to "unlock" the data. Therefore, the website owner cannot analyze the encrypted data.

When the user later sends a request to the website, the request includes a cookie that includes the encryption key generated previously. The website can then use the encryption key to decrypt the encrypted data associated with that user and improve the user's experience based on the decrypted data.

Again, after a certain period of time, the website may generate another encryption key or use the same encryption key to encrypt the data from the first request and/or the data from the second request. The encryption key is deleted and the process repeats.

One-Sided Cookies

Figure 2:
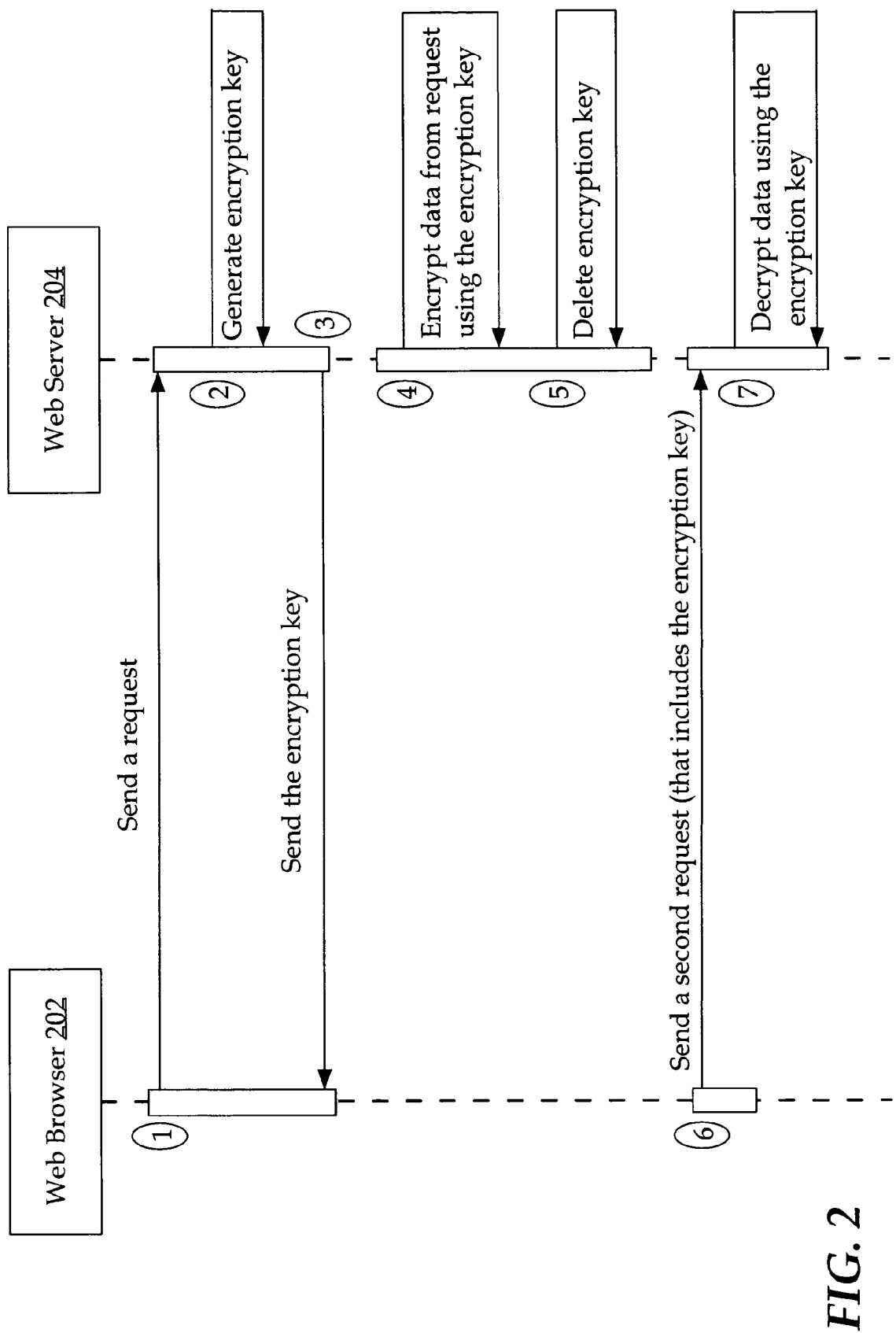
FIG. 2 is a sequence diagram of implementing a one-sided cookie, according to an embodiment of the invention.

FIG. 2 is a sequence diagram of implementing a one-sided cookie, according to an embodiment of the invention.

At step 1, Web browser 202 sends a (e.g., HTTP) request for data to Web server 204. If the request does not include any cookies, then it is likely that Web browser 202 has not previously sent requests to Web server 204.

At step 2, Web server 204 generates an encryption key for encrypting the request (or any portion thereof), such as IP address, the requested file, query terms, etc. Any technique for generating an encryption key may be used. Embodiments of the invention are not limited to any particular technique.

Hereinafter, "target data" will refer to the portion of the request that is to be encrypted. Target data may also include any information sent to Web browser 202 in response to the request. For example, target data may include an identification of a file (e.g., webpage) that was requested, information about the content of the file, advertisements that were sent along with the file, etc.

At step 3, in response to the request, Web server 204 sends the requested data to Web browser 202 along with a cookie that includes the encryption key. If the initial request did not contain a cookie, then Web server 204 includes a "Set-Cookie" instruction in the header of the response. Web server 204 may encrypt the target data before step 3 or immediately after step 3. Generally, however, Web server 204 may forego encrypting the target data for a period of time (e.g., one month) in order to analyze the target data. The time between when a request is received and target data from the request is encrypted is referred to hereinafter as the "target window". The target window may or may not be uniform for all users or even for all requests from a single user.

At step 4, after the target window has "closed", Web server 204 encrypts the target data using the encryption key.

"Delete" Encryption Key

At step 5, which may or may not occur immediately after step 4, Web server 204 deletes the encryption key in such a way that Web server 204 cannot recover the encryption key unilaterally without participation of, for example, a client. Thus, "delete" in this sense indicates that the encryption key is not backed up in any way, nor does a copy of the key exist. The encryption key is irretrievable from Web server 204's point of view. Only Web browser 202 has a copy of the encryption key. Once Web server 204 deletes the encryption key, Web server 204 cannot obtain the original key or a copy of the key until Web browser 202 provides access to its key to Web server 204.

Furthermore, because browsers only offer cookies to Web servers belonging to the same domain that set the cookie, a third party's Web server would not be able to obtain the encryption key stored in the cookie.

At this point, therefore, the target data is effectively "sealed" (at least temporarily) because Web server 204 does not have the key to decrypt the target data. The encrypted target data is essentially unusable for substantive analysis purposes. The cookie on the user's side is referred to as a "one-sided" cookie because the server side does not have any decipherable information with respect to the target data.

At step 6, some time later after the encryption key is deleted, Web browser 202 sends a second request. Because Web browser 202 has requested information from Web server 204 previously, the second request includes the cookie received from Web server 204 in step 3.

Multiple Requests within the Target Window

Web browser 202 may have issued multiple requests to Web server 204 within a target window. In that case, Web server 204 may handle such requests in at least two ways.

First, Web server 204 may prolong the time in which the target data from each request is sealed. For example, suppose the target window is one month. If Web server 204 receives request R1 and R2 on November 1 and 29, respectively, then Web server 204 will not encrypt the target data of R1 and R2 until one month after R2. Thus, the target window is effectively extended for R1.

Second, Web server 204 may encrypt the target data of all requests within a target window at the end of the target window. For example, suppose the target window is one month. If Web server 204 receives requests R1, R2, and R3 on November 1, 5, and 27, respectively, then the target data of each request is encrypted on December 1. Web server 204 receives request R4 on December 3. The cookie data is examined to retrieve the encryption key and the target data of all requests is decrypted and available for analysis (along with the target data from R4) for one month starting from December 3.

One-Sided Cookies (Cont.)

At step 7, Web server 204 retrieves the encryption key from the cookie included in the second request and is now able to decrypt the target data using that encryption key. The target data may now be "unsealed" and accessible for substantive analysis for another period of time (e.g., one month again).

Web server 204 may generate a different encryption key to encrypt the second request (or any portion thereof) and/or the target data from the first request. In this case, Web server 204 responds to the second request by including the different encryption key in a cookie that is sent to Web browser 202.

Alternatively, Web server 204 uses the first encryption key to encrypt the second request and the target data from the first request. In that case, Web server 204 responds to the second request by including the first encryption key in a cookie that is sent to Web browser 202.

This process of encrypting target data, deleting an encryption key, and receiving subsequent requests from the same user may go on indefinitely for that user. If a user ever deletes his/her one-sided cookie, then the target data becomes permanently "sealed" (i.e., that information is not recoverable).

In this manner (at least with respect to servers that implement one-sided cookies), the user maintains full control of his/her privacy.

Hardware Overview

Figure 3:
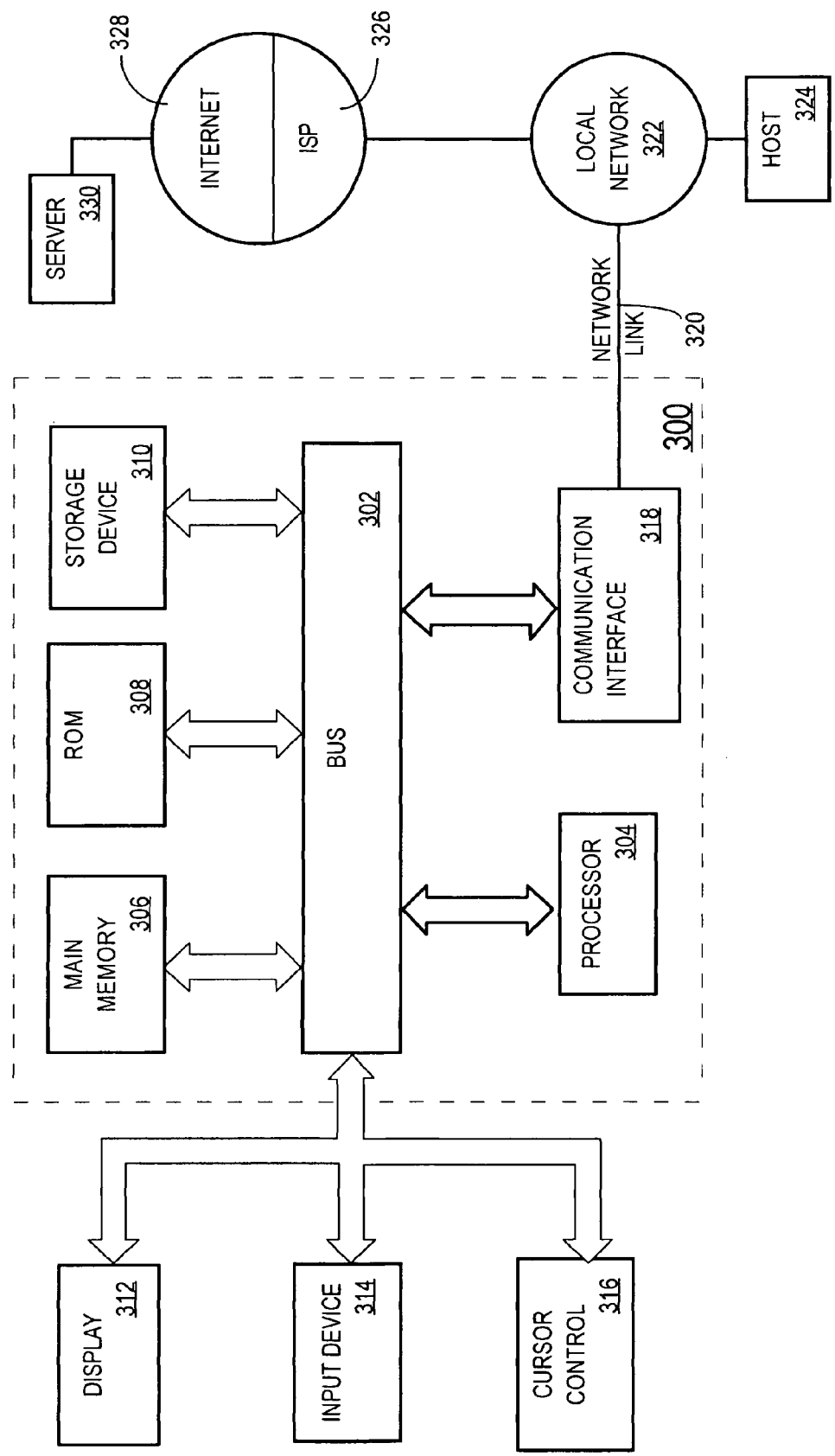
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving, from a client, at a server, a first request that includes first data;
   generating, at the server, an encryption key;
   in response to receiving the first request, determining, at the server, a target point in time, before which the server does not delete the encryption key;
   before the target point in time and in response to receiving the first request, sending, from the server, the encryption key to the client;
   encrypting, at the server, said first data using the encryption key;
   after sending the encryption key to the client and before the target point in time, receiving, from the client, at the server, a second request that includes second data;
   after receiving the second request, encrypting, at the server, said second data using the encryption key;
   storing, at the server, an association between the encrypted first and second data and the client;
   after the target point in time, deleting, at the server, the encryption key;
   after deleting the encryption key, receiving, from the client, at the server, a third request and the encryption key in association with the third request; and
   in response to receiving the third request and based on the association, decrypting, at the server, said first and second data using the encryption key.

2. The method of claim 1, wherein:
   the encryption key is included in a cookie; and
   sending the encryption key to the client includes sending the cookie to the client.

3. One or more storage media storing instructions which, when executed by one or more processors, causes the method recited in claim 2.

4. The method of claim 1, wherein said first data includes at least one of (a) an IP address of the client, or (b) one or more terms of a search query.

5. One or more storage media storing instructions which, when executed by one or more processors, causes the method recited in claim 4.

6. The method of claim 1, wherein the third request includes third data, the method further comprising:
   analyzing, at the server, the first data, the second data, and the third data;
   sending, from the server, a particular encryption key to the client;
   in response to receiving the third request, determining, at the server, a second target point in time, before which the server does not delete the particular encryption key;
   encrypting, at the server, the first data, the second data, and the third data using the particular encryption key; and only after the second target point in time, deleting, at the server, the particular encryption key;
wherein the particular encryption key is either said encryption key or a different encryption key.

7. One or more storage media storing instructions which, when executed by one or more processors, causes the method recited in claim 6.

8. One or more storage media storing instructions which, when executed by one or more processors, causes the method recited in claim 1.

9. A method, comprising:
receiving, from a client, at a server, a first request that includes first data;
generating, at the server, an encryption key;
in response to receiving the first request, determining, at the server, a first target point in time, before which the server does not delete the encryption key;
before the first target point in time and in response to receiving the first request, sending, from the server, the encryption key to the client;
after sending the encryption key to the client and before the first target point in time, receiving, from the client, at the server, a second request that includes second data;
in response to receiving the second request, determining, at the server, a second target point in time, before which the server does not delete the encryption key, wherein the second target point in time is after the first target point in time;
encrypting, at the server, said first data and said second data using the encryption key;
storing an association between the encrypted first and second data and the client;
only after the second target point in time and without receiving a request from the client (1) after the second request and (2) before the second target point in time, deleting, at the server, the encryption key;
receiving, from the client, at the server, a third request and the encryption key in association with the third request; and
in response to receiving the third request and based on the association, decrypting said first and second data using the encryption key.

10. The method of claim 9, wherein:
the encryption key is included in a cookie; and
sending the encryption key to the client includes sending the cookie to the client.

11. One or more storage media storing instructions which, when executed by one or more processors, causes the method recited in claim 10.

12. The method of claim 9, wherein said first data includes at least one of (a) an IP address of the client, or (b) one or more terms of a search query.

13. One or more storage media storing instructions which, when executed by one or more processors, causes the method recited in claim 12.

14. The method of claim 9, wherein the third request includes third data, the method further comprising:
analyzing, at the server, the first data, the second data, and the third data;
sending, from the server, a particular encryption key to the client;
in response to receiving the third request, determining, at the server, a third target point in time, before which the server does not delete the particular encryption key;
encrypting, at the server, the first data, the second data, and the third data using the particular encryption key; and
after the third target point in time, deleting the particular encryption key;
wherein the particular encryption key is either said encryption key or a different encryption key.

15. One or more storage media storing instructions which, when executed by one or more processors, causes the method recited in claim 14.

16. One or more storage media storing instructions which, when executed by one or more processors, causes the method recited in claim 9.

17. A system, comprising:
a client and one or more servers;
wherein the one or more servers are configured to:
receive, from the client, a first request that includes first data;
generate an encryption key;
determine, in response to receiving the first request, a target point in time, before which the one or more servers do not delete the encryption key;
send, before the target point in time and in response to receiving the first request, the encryption key to the client;
encrypt the first data using the encryption key;
store an association between the encrypted first data and the client;
receive, after sending the encryption key to the client and before the target point in time, from the client, a second request that includes second data;
encrypting, after receiving the second request, said second data using the encryption key;
delete, only after the target point in time, the encryption key;
receive, from the client, after deleting the encryption key, a third request and the encryption key in association with the third request; and
in response to receiving the third request and based on the association, decrypt said first and second data using the encryption key; and
wherein the client is configured to:
send the first request to the one or more servers;
receive the encryption key from the one or more servers;
send the second request to the one or more servers; and
send the third request to the one or more servers.

18. The system of claim 17, wherein:
the encryption key is included in a cookie; and
the one or more servers are further configured to send the cookie to the client.

19. The system of claim 17, wherein said first data includes at least one of (a) an IP address of the client, or (b) one or more terms of a search query.

20. The system of claim 17, wherein:
the third request includes third data; and
the one or more servers are further configured to:
analyze the first data, the second data, and the third data;
send a particular encryption key to the client;
determine, in response to receiving the third request, a second target point in time, before which the one or more servers do not delete the particular encryption key;
encrypt the first data, the second data, and the third data using the particular encryption key; and
delete, only after the second target point in time, the particular encryption key;
wherein the particular encryption key is either said encryption key or a different encryption key.

* * * * *